United States Patent [19]

Habgood, Jr.

[11] 3,790,421
[45] Feb. 5, 1974

[54] COMPOSITE ARTICLES AND METHODS OF MAKING THE SAME

[75] Inventor: Robert P. Habgood, Jr., Bradford, Pa.

[73] Assignee: Plexawood, Inc.

[22] Filed: July 8, 1970

[21] Appl. No.: 53,232

[52] U.S. Cl.............. 156/242, 156/77, 161/159, 161/162, 264/45, 264/109, 264/271
[51] Int. Cl. .... B29c 6/02, B29c 27/00, B29d 27/04
[58] Field of Search .............. 264/45, 54, 109, 271; 273/63 G, 82 R; 161/159, 162; 156/77, 242

[56] References Cited
UNITED STATES PATENTS

| 2,658,015 | 11/1953 | Williams | 156/242 X |
| 2,804,418 | 8/1957 | King | 156/242 X |
| 3,415,708 | 12/1968 | Rondum | 156/242 X |
| 3,533,864 | 10/1970 | Ianuzzi et al | 156/242 X |
| 2,548,095 | 4/1951 | Bowers | 264/109 X |
| 3,487,134 | 12/1969 | Burr | 264/45 |
| 3,175,863 | 3/1965 | Hood | 264/45 UX |
| 3,258,861 | 7/1966 | Niconchuk | 264/45 X |
| 3,068,007 | 12/1962 | Satchell | 273/63 G UX |
| 3,258,511 | 6/1966 | McGregor | 264/45 |
| 3,411,781 | 11/1968 | Rytina et al | 273/63 G |

FOREIGN PATENTS OR APPLICATIONS

| 998,513 | 7/1965 | Great Britain | 264/45 |
| 1,032,766 | 6/1966 | Great Britain | 264/45 |
| 860,391 | 2/1961 | Great Britain | 264/45 |

Primary Examiner—Philip E. Anderson
Attorney, Agent, or Firm—Buell, Blenko & Ziesenheim

[57] ABSTRACT

A composite article comprised of a core formed of compressed wood chips and resin, and an external portion of irregular thickness of foamed resin, such as polyurethane, formed in situ to the configuration of the composite article. The composite article may be made by forming the core in a mold, allowing the core to shrink, and filling the remainder of the mold to make up for the shrinkage of the core with foamable liquid resin and curing it to the solid state. Alternatively, the composite article may be made by forming the core in a first mold, allowing the core to shrink, placing the core in a second mold corresponding to the configuration of the composite article and filling said second mold with a foamable liquid resin and curing said liquid resin to the solid state.

15 Claims, 5 Drawing Figures

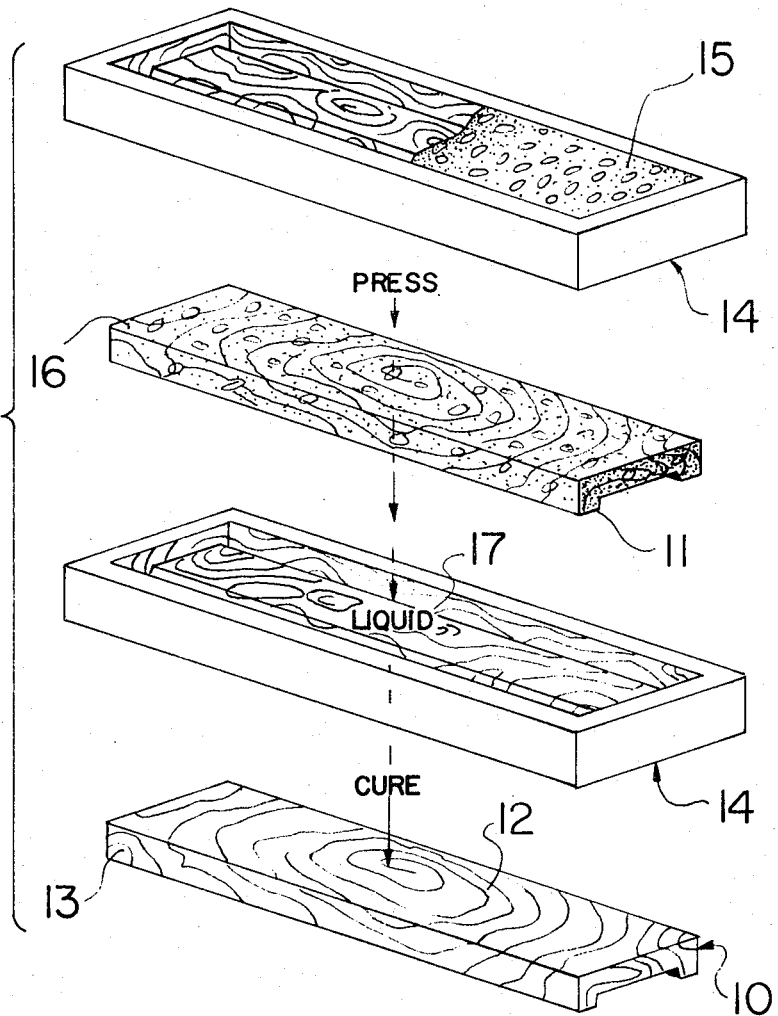

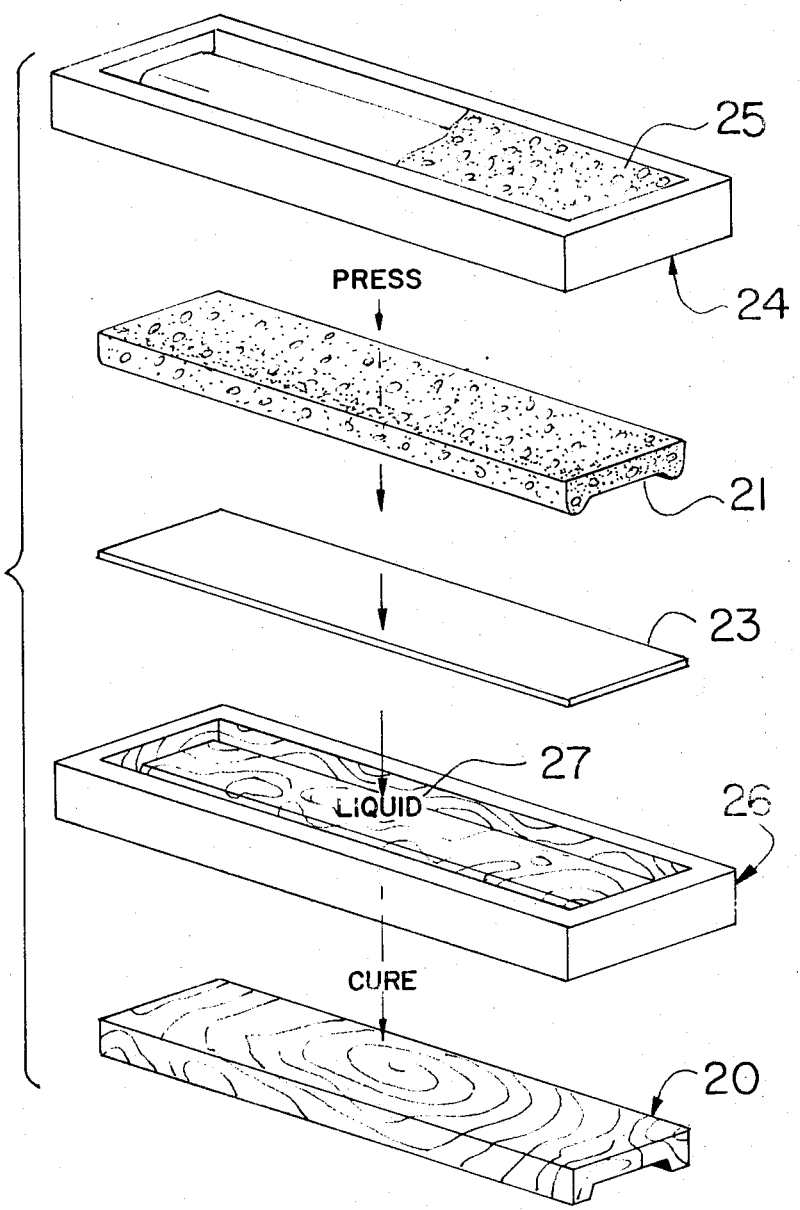

COMPOSITE ARTICLES AND METHODS OF MAKING THE SAME

This invention relates to composite articles having a core of compressed wood chips and resin and an external portion of foamed resin, and methods of making them. It is particularly useful in making such composite articles of superior quality inexpensively.

Plastic products have been molded to final form by various molding techniques including compression, transfer and injection molding. Such products have been found in furniture, building materials, and industrial and consumer products of all sorts. Such products required an appreciable weight of material and in turn the material costs were a relatively large proportion of the cost of the product. It was broadly old and well-known to reduce the weight of the plastic material and in turn reduce the cost of the product by preforming a core of wood chips and resin (commonly called a "cookie") corresponding to the configuration of the desired composite product and thereafter overlaid the surface with a wood veneer or paper or plastic laminate. But such plastic products did not fully satisfy the demand for a lightweight composite article for uses such as chair seats, table tops and the like having an outer surface of quality appearance that is tough and durable.

The methods heretofore involved in the manufacture of such composite articles were expensive and time consuming. A metal mold wherein the wood chips and resin were subjected to elevated pressure and temperature was necessary to form the core and another metal mold wherein the formed core was again subjected to elevated pressure and temperature was necessary to form the overlay. Such metal molds were expensive to build and the practice was generally complicated to carry-out. In addition, there was always non-uniform shrinkage of the molded core as it came from the first mold. This shrinkage created problems in the second mold because it was difficult, if not impossible to apply pressure uniformly over the surface of the core and defective surfaces resulted. In short, this practice resulted in a considerable percentage of off-quality product.

The present invention overcomes these disadvantages and difficulties, reducing substantially the cost of manufacture and producing quality products with few rejects.

I provide a composite article comprising a core formed of compressed wood chips and resin, and an external portion of irregular thickness of foamed resins, preferably polyurethane, formed in situ to the configuration of the composite article. The external portion may in addition have attached to it a decorative sheet overlay such as a melamine impregnated paper. Alternatively or additionally, surface portions of said external portion may contain a simulated wood grain finish.

I prefer that the composite article hereinabove described be made by a method comprising the steps of forming a core of wood chips and resin in a mold, allowing said core to shrink, placing said core in a mold corresponding to the configuration of said composite article, filling portions of said mold corresponding to the configuration of said composite article surrounding said core with a foamable liquid resin mixture, and causing said liquid resin to cure to a solid state to form an external portion of said composite article.

The mold for forming said core of wood chips and resin, the first mold, is preferably made of metal and capable of withstanding the pressures and temperatures necessary to mold the wood chips and resin into a cohesive core.

Preferably the finish on said first mold need only be rough. It may correspond in dimension to the configuration of said composite article, but alternatively, preferably it varies in dimension and shape with the structural needs of the composite article and functional needs of the interior of the composite article being formed. The formed core of compressed wood chips and resin can then be placed in a second mold different from said first mold and corresponding to the configuration of the composite article. Said second mold is carefully finished to the dimensions of the composite article and has a surface finish capable of imparting the desired surface finish to the composite article. Said second mold can be made of a low cost material, such as epoxy or silicone resin, because it need not withstand the high pressures and temperatures necessary to form the core of wood chips and resin. It can also be faced with rubber having a desired decorative finish to be imparted to the finished article so as to permit easy removal of complex surfaces.

In an alternative preferred embodiment the core of wood chips and resin is formed in a mold corresponding to the configuration of the composite article. After the core is formed, it is allowed to shrink, possibly in the mold, and the foamable liquid resin is put in the mold, possibly by injection. The liquid resin is then allowed to foam up against the mold surface to make up for the shrinkage of the core and impart the desired decorative finish to the surface of the composite article.

The foamable thermosetting liquid resin reaction mixture may be any of the known resin compositions capable of foaming such as foamable urethane resins, foamable epoxy resins and the like. I prefer however the urethane resin to be used. It can be cured to the solid state rapidly without the addition of heat. When cured, it is solid, durable and shrinkage can be controlled; in some cases, there can be shrinkage of about one-half percent or less. It may be flexible or rigid or a degree in between depending on whether the basic intermediate polymer, called a "polyol," is bifunctional or polyfunctional and whether the isocyanate with which the polyol is reacted is bifunctional or polyfunctional. If the polyol and isocyanate are substantially bifunctional the resultant polyurethane should be flexible; and if the polyol and isocyanate are substantially polyfunctional, the resultant polyurethane should be substantially rigid.

Typical formulations of the liquid urethane resin mixture which I have used to form the external portion of the composite article are as follows:

| Materials by Tradename and Manufacture or Composition | Parts by Weight | |
|---|---|---|
| | Formulation No. 1 | Formulation No. 2 |
| PAPI (Upjohn) | 72.3 | 72.3 |
| T-222 (Union Carbide) | 50.0 | 50.0 |
| Pluracol 225 (Wyandotte) | 50.0 | 50.0 |
| L-520 Silicone (Union Carbide) | 1.5 | 1.5 |
| Dabco (Houdry) | 0.37 | 0.37 |
| Freon F-11 (DuPont) | 10.0 | 10.0 |
| Atomite (Calcium Carbonate) | — | 50.0 |

In addition, I prefer that the polyurethane used to form the external portions of the composite article be of high enough density that the surface thereof will not be marred by cigarette burns. This preference can be accomplished by adding a filler to the liquid urethane mixture or by reducing the foaming action during curing. This preference may not be a consideration where a decorative overlay is applied to the external portion because the overlay should sufficiently dissipate the heat to protect the polyurethane from marring by cigarette burns.

As an additional step in making one preferred embodiment of my invention the external portion of said composite article is contacted with a decorative sheet overlay. The contacting may be done while the external portion is simply a liquid resin mixture, after it is partially cured (and as a part thereof partially foamed), or after the external portion is completely formed by application under heat and pressure.

Other details, objects and advantages of my invention will become apparent as the following description of the presently preferred embodiments proceed.

In the accompanying drawings I illustrate presently preferred embodiments of my invention in which:

FIG. 4 is a flow diagram of a drawer front made according to one embodiment of my invention; and FIG. 5 is a flow diagram of a drawer front made according to another embodiment of my invention.

Referring specifically to the drawings, I illustrate as a composite article a drawer front 10 having a core 11 of compressed wood chips and resin and an external portion 12 of in situ foamed resin such as polyurethane. The surface 13 of said external portion 12 contains a decorative finish of simulated wood grain.

Figure 1:
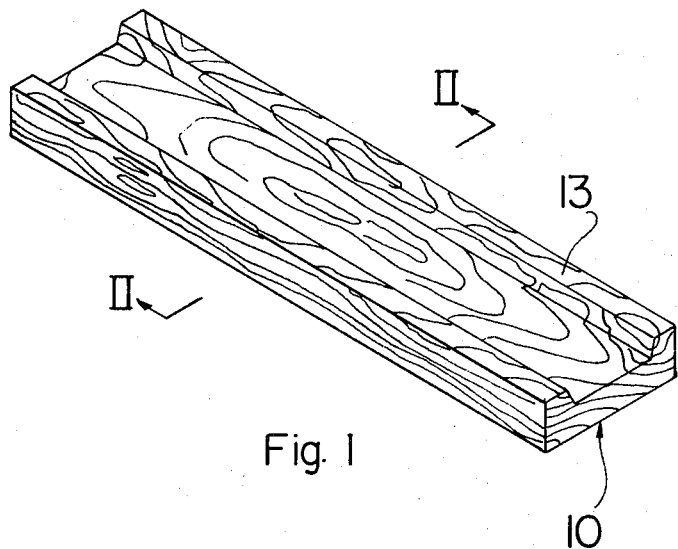
FIG. 1 is an isometric view of a drawer front made according to and embodying my invention.
Figure 2:
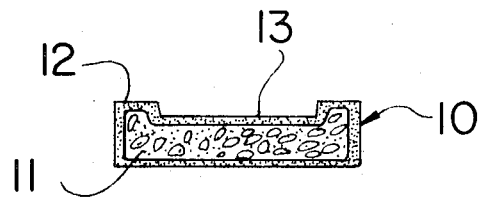
FIG. 2 is a cross-sectional view taken along line II—II of FIG. 1.
Figure 3:
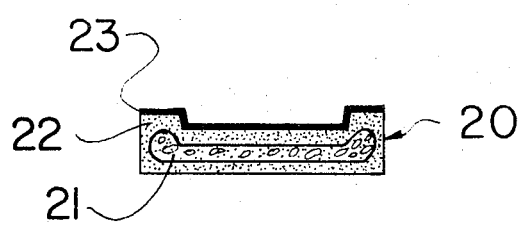
FIG. 3 is a cross-sectional view of another drawer front made according to and embodying my invention.

In FIG. 3 I illustrate a drawer front 20 having a core 21 of compressed wood chips and resin, an external portion 22 of foamed resin, and a decorative sheet overlay 23 of melamine impregnated paper.

In FIG. 4 I have shown a flow diagram illustrating the drawer front 10 made according to my invention. In this embodiment a mold 14 capable of withstanding elevated temperatures and pressures, corresponding to the configuration of the drawer front 10 and having a reverse wood grain surface in surface portion thereof is filled with a mixture of wood chips and resin 15. The mold 14 is then closed and placed in a press where heat (preferably about 325°F.) and pressure (preferably about 1,500 p.s.i.) for a time sufficient to cure the wood chips and resin 15 (preferably about 4 minutes for one-half inch thickness) is applied. The mold 14 is thereafter opened and the core 11 of compressed wood chips and resin is allowed to shrink. At this point the core 11 has a wood grain finish contained in its surface portions 16.

The portions of the mold 14 left open by the shrinking of the core 11 is then filled with a foamable resin mixture 17. The mold 14 is then closed and the liquid resin mixture 17 allowed to cure (and foam) against the surface of the mold to make up for the shrinkage of the core 11 and to form an external portion 12 of the drawer front 10. The mold 14 is then opened and the drawer front 10 removed as a composite article. The external portion 12 of drawer front 10 has a wood grain decorative finish contained in its surface 13.

In FIG. 5 I have shown a flow diagram illustrating the making of the drawer front 20 according to another embodiment of my invention. In this embodiment I fill a first mold 24 capable of withstanding elevated temperatures and pressures with a mixture of wood chips and resin 25. The mold 24 does not correspond to the configuration of the drawer front 20 but is of a configuration suitable for the structural needs of the drawer front 20 and the functional needs of the interior of a drawer. The mold 24 is then closed and placed in a press where heat (preferably about 325°F.) and pressure (preferably about 1,500 p.s.i.) for a time sufficient to cure the wood chips and resin 25 (approximately about 4 minutes for one-half inch thickness) is applied. The mold 24 is thereafter removed from the press, and the core 21 removed from the mold 24 and allowed to shrink.

A decorative sheet overlay 23 of melamine impregnated paper is placed in second mold 26. Second mold 26 corresponds to the configuration of the drawer front 20 and has a reverse wood grain in surface portions thereof. A measured quantity of a foamable resin mixture 27 is then placed in second mold 26 in contact with the decorative sheet overlay 23 and the core 21 is placed in second mold 26 so that the liquid resin 27 surrounds it. The second mold 26 is then closed and the liquid resin 27 is allowed to cure (and foam). The second mold 26 is then opened and the composite drawer front 20 removed. The surface portions of the drawer front 20 contain a wood grain decorative finish imparted by surface portions of the second mold 26.

While I have illustrated and described certain preferred methods and embodiments of my invention in the foregoing specification, it should be understood that this invention may be otherwise embodied within the scope of the following claims.

I claim:

1. A method of making a composite article comprising the steps of: forming as the major component of the final composite article a core of wood chips and resin in a mold having the general configuration of the final article but smaller in all dimensions; allowing said core to shrink suspending said core in a mold corresponding to the final configuration of said composite article; filling portions of said mold corresponding to the configuration of said composite article surrounding said core with a foamable thermosetting liquid resin reaction mixture; and permitting said foamable thermosetting resin reaction mixture to foam and cure to form a solid foamed resin layer as an external continuous surface portion of said composite article surrounding the core as the major component.

2. A method of making a composite article as claimed in claim 6 wherein said mold used to form said core has smaller dimensions and a corresponding configuration to said mold corresponding to the configuration of said composite article.

3. A method of making a composite article as claimed in claim 1 wherein said mold corresponding to the configuration of said composite article has surface portions provided with a decorative finish to be imparted to the surface of said composite article.

4. A method of making a composite article as claimed in claim 1 wherein said mold corresponding to the configuration of said composite article has surface portions provided with a rubber facing having a decorative finish to be imparted to said composite article.

5. A method of making a composite article as claimed in claim 2 wherein said foamable thermosetting liquid resin reaction mixture is injected into said mold.

6. A method of making a composite article as claimed in claim 1 wherein said foamable thermosetting liquid resin reaction mixture is a foamable polyurethane resin reaction mixture.

7. A method of making a composite article as claimed in claim 1 comprising the additional step of laminating a decorative sheet overlay under the conditions of heat and pressure to said external portion of said composite article.

8. A method of making a composite article as claimed in claim 1 comprising the additional step of placing a decorative sheet overlay in said mold corresponding to the configuration of said composite article before said foamable thermosetting liquid resin reaction mixture is placed in said mold.

9. A method of making a composite article as claimed in claim 2 comprising the additional step of placing a decorative sheet overlay in said mold before said foamable thermosetting liquid resin reaction mixture is placed in said mold.

10. A method of making a composite article comprising the steps of: forming as the major component of the final composite article a core of wood chips and resin in a first mold; allowing said core to shrink; suspending said core in a second mold having large dimensions and a different configuration from said first mold and corresponding to the configuration of the final composite article; filling portions of said second mold surrounding said core with a liquid thermosetting foamable resin reaction mixture; and permitting said liquid foamable thermosetting resin reactions mixture to foam and cure to form a solid foamed resin layer as an external portion of said composite article.

11. A method as claimed in claim 10 wherein said mold has surface portions provided with decorative finish to be imparted to the surface of said composite article.

12. A method as claimed in claim 10 wherein said second mold has surface portions provided with a rubber facing having a decorative finish to be imparted to said composite article.

13. A method of making a composite article as claimed in claim 10 wherein said foamable thermosetting liquid resin reaction mixture is a foamable polyurethane resin reaction mixture.

14. A method of making a composite article as claimed in claim 10 comprising the additional step of laminating a decorative sheet overlay under the conditions of heat and pressure to said external portion of said composite article.

15. A method of making a composite article as claimed in claim 10 comprising the additional step of placing a decorative sheet overlay in said second mold before said foamable thermosetting liquid resin reaction mixture is placed in said mold.

* * * * *

UNITED STATES PATENT OFFICE
CERTIFICATE OF CORRECTION

Patent No. 3,790,421          Dated February 5, 1974

Inventor(s) Robert P. Habgood, Jr.

It is certified that error appears in the above-identified patent and that said Letters Patent are hereby corrected as shown below:

Column 4, Claim 1, line 46, after "shrink" insert a semicolon; line 52, before "resin" insert --liquid--.

Column 6, Claim 10, line 6, "reactions" should be --reaction--.

Column 6, Claim 11, line 10, after "with" insert --a--.

Signed and sealed this 14th day of May 1974.

(SEAL)
Attest:

EDWARD M. FLETCHER, JR.
Attesting Officer

C. MARSHALL DANN
Commissioner of Patents